United States Patent
Matsueda et al.

(10) Patent No.: US 9,321,506 B2
(45) Date of Patent: Apr. 26, 2016

(54) BICYCLE HYDRAULIC OPERATING DEVICE

(71) Applicant: SHIMANO INC., Sakai (JP)

(72) Inventors: Keiji Matsueda, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 457 days.

(21) Appl. No.: 14/043,775

(22) Filed: Oct. 1, 2013

(65) Prior Publication Data

US 2015/0090112 A1    Apr. 2, 2015

(51) Int. Cl.
*B60T 7/08*    (2006.01)
*B62L 3/02*    (2006.01)
*B62K 23/06*    (2006.01)

(52) U.S. Cl.
CPC *B62L 3/023* (2013.01); *B62K 23/06* (2013.01)

(58) Field of Classification Search
CPC .................................. B60T 7/102; B62L 3/023
USPC ........................................................... 60/594
See application file for complete search history.

(56) References Cited

U.S. PATENT DOCUMENTS

| | | | |
|---|---|---|---|
| 4,921,081 A | 5/1990 | Chilcote | |
| 2008/0245632 A1 | 10/2008 | Watarai et al. | |
| 2013/0180815 A1 | 7/2013 | Dunlap et al. | |
| 2014/0174234 A1* | 6/2014 | Watarai | B62M 25/04 74/473.11 |
| 2014/0174237 A1* | 6/2014 | Watarai | B62L 3/023 74/489 |
| 2014/0174244 A1* | 6/2014 | Watarai | B62M 25/00 74/502.2 |
| 2015/0090550 A1* | 4/2015 | Matsueda | B62L 3/023 188/344 |

FOREIGN PATENT DOCUMENTS

| | | |
|---|---|---|
| DE | 10 2012 015 331 | 2/2013 |
| DE | 10 2013 000 565 | 7/2013 |
| JP | 3182205 U | 3/2013 |
| JP | 3182206 U | 3/2013 |
| JP | 3182207 U | 3/2013 |
| JP | 3182208 U | 3/2013 |
| JP | 3182209 U | 3/2013 |
| JP | 3182210 U | 3/2013 |

OTHER PUBLICATIONS

German Search Report for corresponding DE Application No. 10 2014 113 703.5, Jul. 24, 2015.

* cited by examiner

*Primary Examiner* — Michael Leslie
(74) *Attorney, Agent, or Firm* — Mori & Ward, LLP

(57) ABSTRACT

A bicycle hydraulic operation device comprises a bracket, a hydraulic cylinder, a piston a lever, and a first biasing member. The bracket includes a gripping portion configured to be gripped by a rider. The piston is disposed within the hydraulic cylinder and movable between an initial position and an actuated position. The lever is pivotally mounted to the bracket around a first axis and operatively coupled to the piston to move the piston in response to pivotal movement of the lever from a rest position to an operated position. The first biasing member is operatively coupled to the piston and the lever outside the hydraulic cylinder such that the first biasing member biases the piston toward the initial position and biases the lever toward the rest position.

19 Claims, 14 Drawing Sheets

BICYCLE HYDRAULIC OPERATING DEVICE

BACKGROUND OF THE INVENTION

1. Field of the Invention

The present invention relates to a bicycle hydraulic operating device.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, some bicycles have been provided with a bicycle hydraulic system. The bicycle hydraulic system includes a hydraulic operating mechanism and a hydraulically actuated component, for example.

SUMMARY OF THE INVENTION

In accordance with a first aspect of the present invention, a bicycle hydraulic operation device comprises a bracket, a hydraulic cylinder, a piston a lever, and a first biasing member. The bracket includes a gripping portion configured to be gripped by a rider. The piston is disposed within the hydraulic cylinder and movable between an initial position and an actuated position. The lever is pivotally mounted to the bracket around a first axis and operatively coupled to the piston to move the piston in response to pivotal movement of the lever from a rest position to an operated position. The first biasing member is operatively coupled to the piston and the lever outside the hydraulic cylinder such that the first biasing member biases the piston toward the initial position and biases the lever toward the rest position.

In accordance with a second aspect of the present invention, the bicycle hydraulic operating device according to the first aspect further comprises an intermediate member configured to be operatively coupled to the piston. The first biasing member includes a first end portion configured to engage with the intermediate member so as to bias the piston toward the initial position.

In accordance with a third aspect of the present invention, the bicycle hydraulic operating device according to the second aspect is configured so that the intermediate member is configured to contact the lever so as to apply biasing force of the first biasing member to the lever.

In accordance with a fourth aspect of the present invention, the bicycle hydraulic operating device according to the second aspect is configured so that the first biasing member further includes a second end portion configured to engage with the bracket.

In accordance with a fifth aspect of the present invention, the bicycle hydraulic operating device according to the fourth aspect is configured so that the first biasing member further includes a first main body having a cylindrical shape, the first end portion and the second end portion extend from the first main body.

In accordance with a sixth aspect of the present invention, the bicycle hydraulic operating device according to the fifth aspect is configured so that the bracket further includes a pivot shaft and a support shaft. The pivot shaft defines the first axis of the lever and is configured to pivotally support the lever. The support shaft differs from the pivot shaft and passes through the first main body so as to support the first biasing member.

In accordance with a seventh aspect of the present invention, the bicycle hydraulic operating device according to the sixth aspect is configured so that the second end portion engages with the pivot shaft.

In accordance with an eighth aspect of the present invention, the bicycle hydraulic operating device according to the sixth aspect is configured so that the support shaft is provided below the pivot shaft in a state where the bracket is mounted to the bicycle handlebar.

In accordance with a ninth aspect of the present invention, the bicycle hydraulic operating device according to the second aspect is configured so that the bracket includes a guide structure configured to guide the intermediate member to move the piston between the initial position and the actuated position.

In accordance with a tenth aspect of the present invention, the bicycle hydraulic operating device according to the ninth aspect is configured so that the intermediate member includes a first guide end portion and a second guide end portion. The first guide end portion and the second guide end portion oppositely extend in an axial direction defined along the first axis. The guide structure includes a first guide groove and a second guide groove. The first guide groove is configured to guide the first guide end portion. The second guide groove configured to guide the second guide end portion.

In accordance with an eleventh aspect of the present invention, the bicycle hydraulic operating device according to the tenth aspect is configured so that the first end portion of the first biasing member engages with the first guide end portion of the intermediate member.

In accordance with a twelfth aspect of the present invention, the bicycle hydraulic operating device according to the eleventh aspect further comprises a second biasing member operatively coupled to the piston and the lever outside the hydraulic cylinder such that the second biasing member biases the piston toward the initial position and biases the lever toward the rest position.

In accordance with a thirteenth aspect of the present invention, the bicycle hydraulic operating device according to the twelfth aspect is configured so that the second biasing member is spaced apart from the first biasing member in the axial direction.

In accordance with a fourteenth aspect of the present invention, the bicycle hydraulic operating device according to the thirteenth aspect is configured so that the second biasing member includes a third end portion configured to engage with the second guide end portion of the intermediate member so as to bias the piston toward the initial position.

In accordance with a fifteenth aspect of the present invention, the bicycle hydraulic operating device according to the fourteenth aspect is configured so that the second biasing member further includes a fourth end portion and a second main body. The fourth end portion is configured to engage with the bracket. The second main body has a cylindrical shape. The third end portion and the fourth end portion extend from the second main body.

In accordance with a sixteenth aspect of the present invention, the bicycle hydraulic operating device according to the fifteenth aspect is configured so that the first biasing member further includes a second end portion and a first main body. The second end portion is configured to engage with the bracket. The first main body has a cylindrical shape. The first end portion and the second end portion extend from the first main body. The bracket further includes a pivot shaft and a support shaft. The pivot shaft defines the first axis of the lever and is configured to pivotally support the lever with respect to the bracket. The support shaft differs from the pivot shaft and passes through the first main body and the second main body so as to support the first biasing member and the second biasing member.

In accordance with a seventeenth aspect of the present invention, the bicycle hydraulic operating device according to the first aspect is configured so that the hydraulic cylinder is provided on the bracket.

In accordance with an eighteenth aspect of the present invention, the bicycle hydraulic operating device according to the first aspect is configured so that one of the bracket and the lever has a cable operating mechanism. The lever is configured to be rotatable about a second axis which differs from the first axis and is operatively connected to the cable operating mechanism in response to rotational movement of the lever around the second axis.

In accordance with a nineteenth aspect of the present invention, the bicycle hydraulic operating device according to the first aspect further comprises an electric switch unit provided on at least one of the bracket and the lever and configured to be electrically connected to a bicycle electric component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
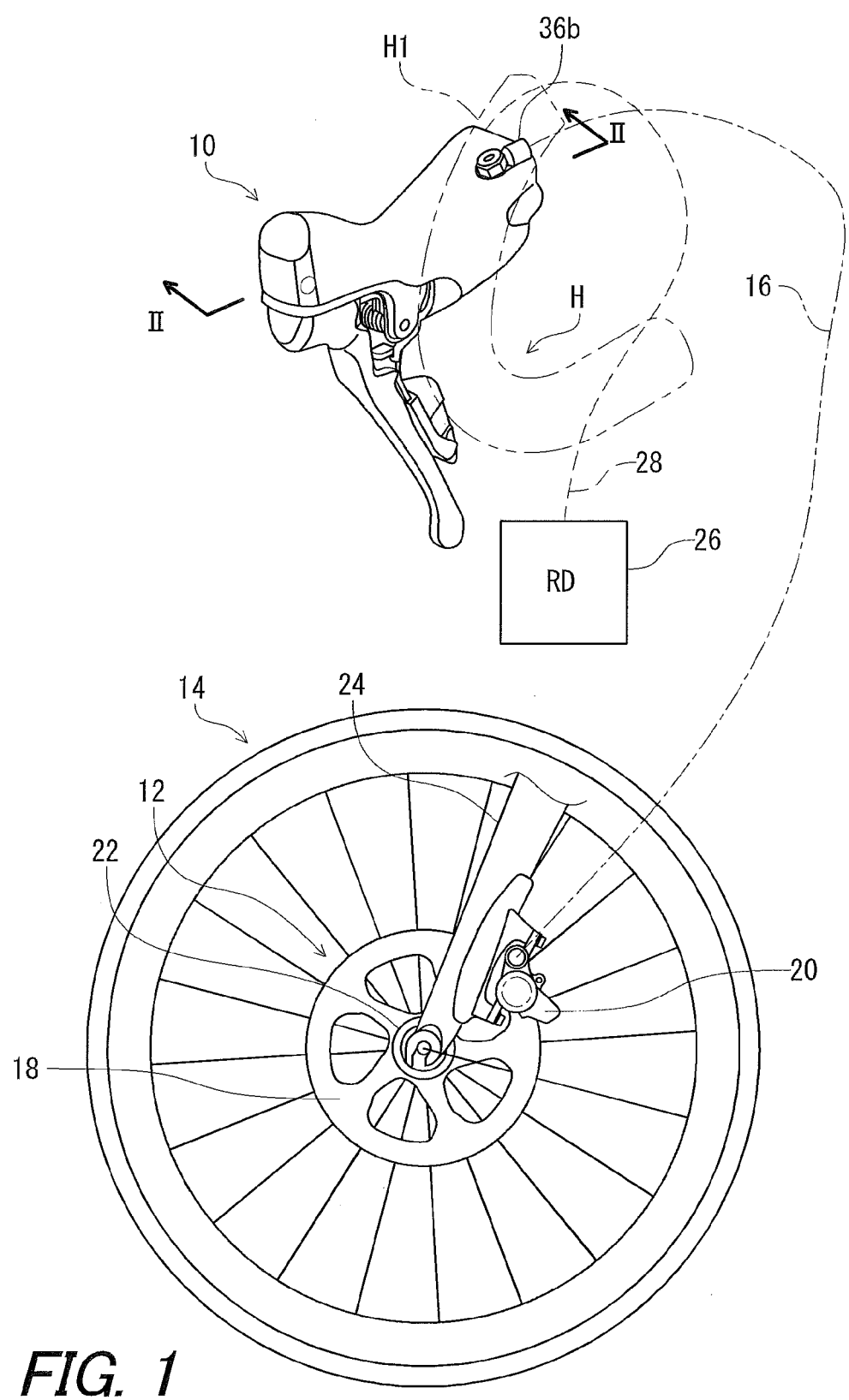
FIG. 1 is a schematic diagram of a hydraulic brake device and a bicycle hydraulic operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle hydraulic operating device 10 in accordance with the first embodiment is illustrated. The bicycle hydraulic operating device 10 is configured to be attached to a bicycle handlebar H of a bicycle. The bicycle handlebar H is a dropdown bicycle handlebar, for example. The bicycle hydraulic operating device 10 is configured to operate a hydraulic brake device 12 to apply a braking force to a front wheel 14. More specifically, the bicycle hydraulic operating device 10 is configured to generate hydraulic pressure. The hydraulic brake device 12 is a hydraulic disc brake device and is configured to be actuated via the hydraulic pressure generated by the bicycle hydraulic operating device 10. The bicycle hydraulic operating device 10 is configured to be coupled to the hydraulic brake device 12 via a hydraulic pressure hose 16. The hydraulic brake device 12 includes a brake disc 18 and a caliper 20. The brake disc 18 is attached to a hub 22 of the front wheel 14 to be rotatable integrally with the front wheel 14. The caliper 20 is mounted to a front fork 24 of the bicycle to squeeze the brake disc 18. While the hydraulic brake device 12 is the hydraulic disc brake device, it will be apparent to those skilled in the bicycle field from the present disclosure that the hydraulic brake device 12 can be a hydraulic rim brake device, for example.

The bicycle hydraulic operating device 10 is further configured to operate a rear derailleur 26 to shift gears. The bicycle hydraulic operating device 10 is configured to be coupled to the rear derailleur 26 via an operation cable 28. The operation cable 28 is a mechanical cable such as a Bowden cable having an inner cable.

As described above, the bicycle hydraulic operating device 10 includes both a braking function and a shifting function in a single unit. However, it will be apparent to those skilled in the bicycle field from the present disclosure that the shifting function can be eliminated from the bicycle hydraulic operating device 10 if needed and/or desired.

The bicycle hydraulic operating device 10 is a right hand side operating device configured to be operated by a rider's right hand to operate the hydraulic brake device 12 and the rear derailleur 26. However, it will be apparent to those skilled in the bicycle field from the present disclosure that the configuration of the bicycle hydraulic operating device 10 can be adapted to a left hand side operating device configured to be operated by the rider's left hand. In such embodiment, a rear brake device and a front derailleur (not shown) are operated using the bicycle hydraulic operating device 10, for example.

In the present application, the following directional terms "front", "rear", "forward", "rearward", "left", "right", "transverse", "upward" and "downward" as well as any other similar directional terms refer to those directions which are determined on the basis of the rider who sits on a saddle (now shown) of the bicycle with facing the bicycle handlebar H, for example. Accordingly, these terms, as utilized to describe the bicycle hydraulic operating device 10, should be interpreted relative to the bicycle as used in an upright riding position on a horizontal surface.

As seen in FIG. 1, the bicycle hydraulic operating device 10 is mounted to a curved section H1 of the bicycle handlebar H.

In other words, the bicycle hydraulic operating device 10 is particularly designed for a bicycle that is equipped with the dropdown bicycle handlebar such as the bicycle handlebar H. However, it will be apparent to those skilled in the bicycle field from the present disclosure that the bicycle hydraulic operating device 10 can be applied to different types of handlebars if needed and/or desired.

Figure 2:
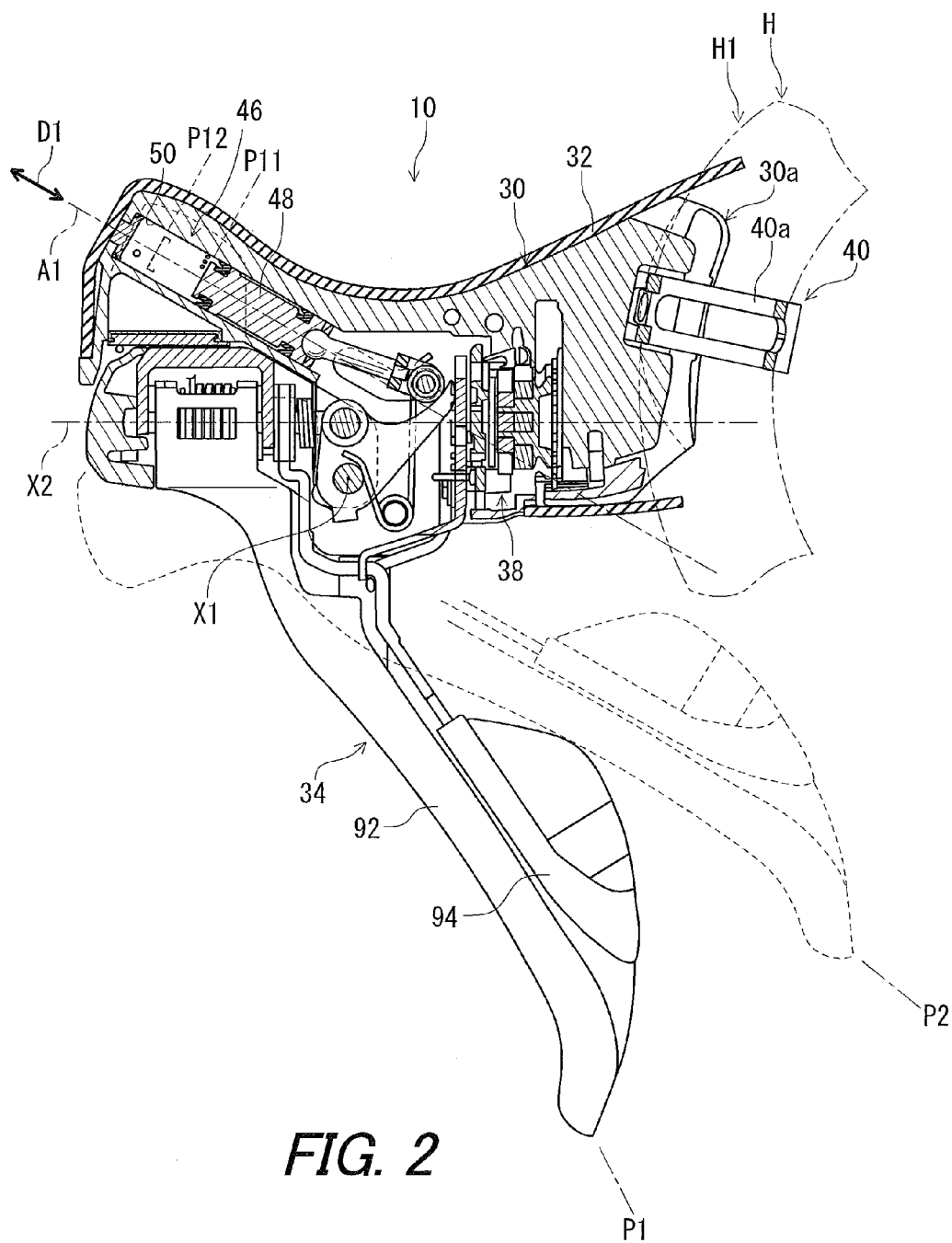
FIG. 2 is a cross-sectional view of the bicycle hydraulic operating device take along line II-II of FIG. 1.

As illustrated in FIG. 2, the bicycle hydraulic operating device 10 comprises a bracket 30, a grip cover 32, a lever 34, and a cable operating mechanism 38. The bracket 30 is configured to be mounted to the bicycle handlebar H. In the illustrated embodiment, the grip cover 32 is attached to the bracket 30 to at least partially cover the bracket 30. The grip cover 32 is made of an elastic material such as rubber. The lever 34 is pivotally provided around a first axis X1 relative to the bracket 30 between a rest position P1 and an operated position P2. The cable operating mechanism 38 is configured to be connected to the operation cable 28 (FIG. 1).

As seen in FIG. 2, the lever 34 is pivotally mounted to the bracket 30 around the first axis X1. In the illustrated embodiment, the lever 34 is biased from the operated position P2 to the rest position P1 with respect to the bracket 30. The pivotal movement of the lever 34 is restricted by a stopper (not shown) between the rest position P1 and the operated position P2. The lever 34 is configured to perform a braking operation of the hydraulic brake device 12.

As seen in FIG. 2, the bracket 30 includes a handlebar attachment portion 30a. A mounting member 40 is mounted to the handlebar attachment portion 30a. The mounting member 40 is configured to couple the bracket 30 to the bicycle handlebar H. The mounting member 40 is a handlebar clamp configured to be attached to the bracket 30 for releasably securing the bracket 30 to the curved section H1 of the bicycle handlebar H. In the illustrated embodiment, the mounting member 40 includes a band 40a configured to be coupled to the handlebar attachment portion 30a. The handlebar attachment portion 30a is arranged at an opposite side of the lever 34 and is configured to contact the curved section H1 (FIG. 1) of the bicycle handlebar H when a fastener (not shown) is tightened to move the band 40a towards the handlebar attachment portion 30a. It will be apparent to those skilled in the bicycle field from the present disclosure that the mounting member 40 is not limited to the illustrated clamp, but rather other suitable attachment mechanisms can be used as needed and/or desired.

Figure 3:
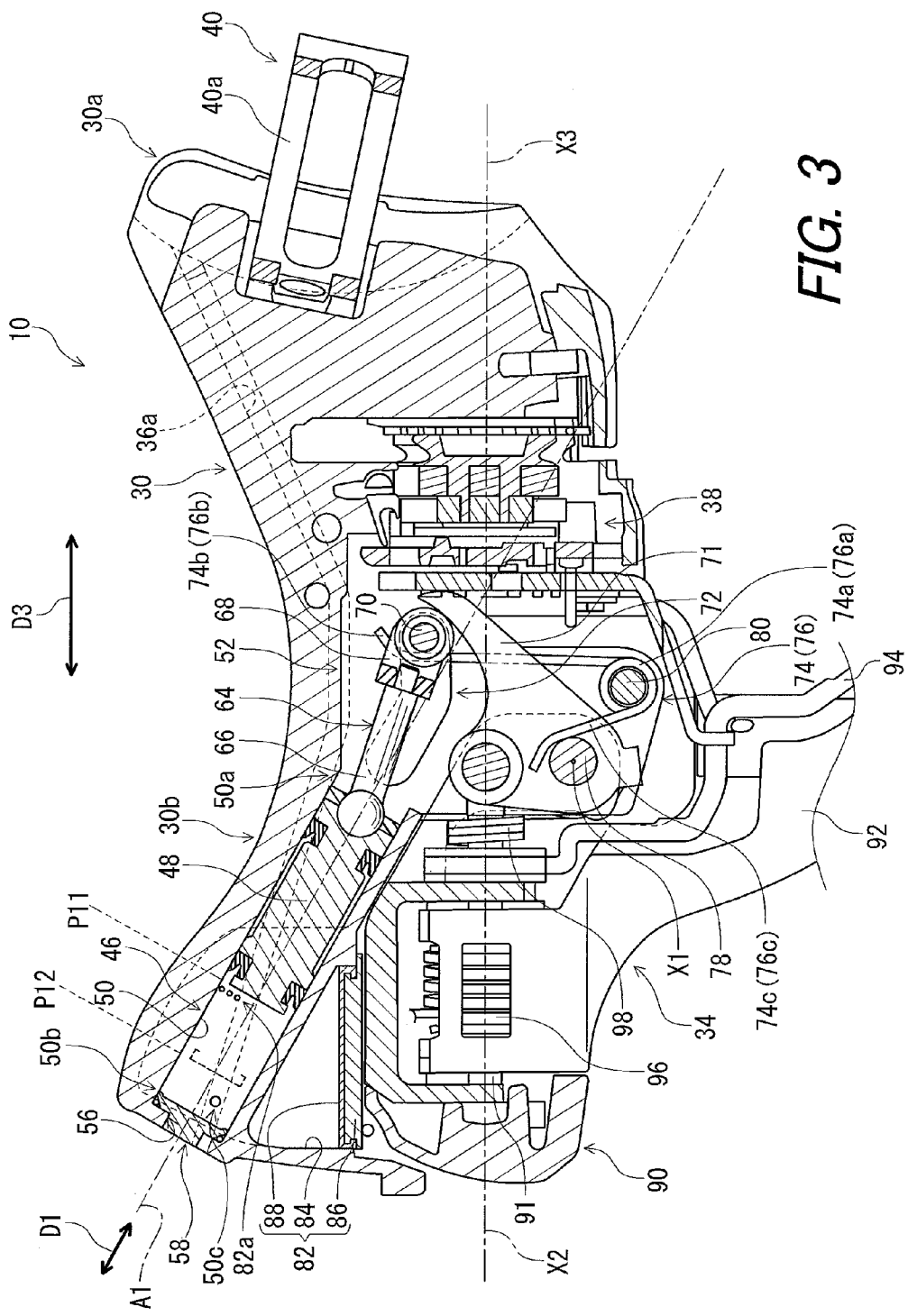
FIG. 3 is a partial enlarged cross-sectional view of the bicycle hydraulic operating device illustrated in FIG. 1.

As seen in FIG. 3, the bracket 30 further includes a grip portion 30b configured to be griped by a rider. The bracket 30 is made of a rigid and/or hard material such as a metallic material or a resin material. In the illustrated embodiment, the handlebar attachment portion 30a and the grip portion 30b are integrally provided as a one-piece unitary member. Of course, the handlebar attachment portion 30a and the grip portion 30b can have removable members as needed and/or desired.

As seen in FIG. 3, the bicycle hydraulic operating device 10 further comprises a hydraulic cylinder 46 and a piston 48. The hydraulic cylinder 46 has a cylinder bore 50. The cylinder bore 50 extends in a first direction D1. The cylinder bore 50 has a center axis A1. The first direction D1 is defined along the center axis A1 of the cylinder bore 50, for example. The hydraulic cylinder 46 is provided on the bracket 30. The cylinder bore 50 is provided in the bracket 30. Namely, it can be said that the bracket 30 has the cylinder bore 50. In the illustrated embodiment, the hydraulic cylinder 46 (the cylinder bore 50) is at least partially provided in the grip portion 30b of the bracket 30 and is integrally provided in the bracket 30 as a one-piece unitary member. However, it will be apparent to those skilled in the bicycle field from the present disclosure that the hydraulic cylinder 46 (the cylinder bore 50) can be provided in a portion other than the grip portion 30b in the bracket 30. Furthermore, it will be apparent to those skilled in the bicycle field from the present disclosure that the hydraulic cylinder 46 (the cylinder bore 50) can be a separate member from the bracket 30.

As seen in FIG. 3, the piston 48 is configured to be movably disposed within the cylinder bore 50 of the hydraulic cylinder 46. More specifically, the piston 48 is configured to be movable in the first direction D1 relative to the bracket 30 within the cylinder bore 50. As seen in FIG. 2, the lever 34 is operatively coupled to the piston 48 to move the piston 48 in response to pivotal movement of the lever 34 from the rest position P1 to the operated position P2. The piston 48 is movable disposed within the cylinder bore 50 in a reciprocal manner in response to operation of the lever 34.

As illustrated in FIG. 3, the cylinder bore 50 includes a first end 50a and a second end 50b. The first end 50a is open to an internal space 52 of the bracket 30. The cable operating mechanism 38 and a part of the lever 34 are disposed in the internal space 52, for example. The piston 48 and the internal surface of the cylinder bore 50 define a cylinder chamber. The cylinder chamber is configured to be filled with hydraulic fluid. The second end 50b is opposite to the first end 50a in the first direction D1.

As seen in FIG. 3, the bracket 30 includes a through-hole 56 connected to the second end 50b of the cylinder bore 50. The through-hole 56 extends in the first direction D1 from the cylinder bore 50 to an outside of the bracket 30. The cylinder bore 50 and the through-hole 56 are provided by machining, for example. The through-hole 56 improves the machining of the cylinder bore 50. The bicycle hydraulic operating device 10 further comprises a plug member 58. The plug member 58 is configured to plug up the through-hole 56.

Figure 4:
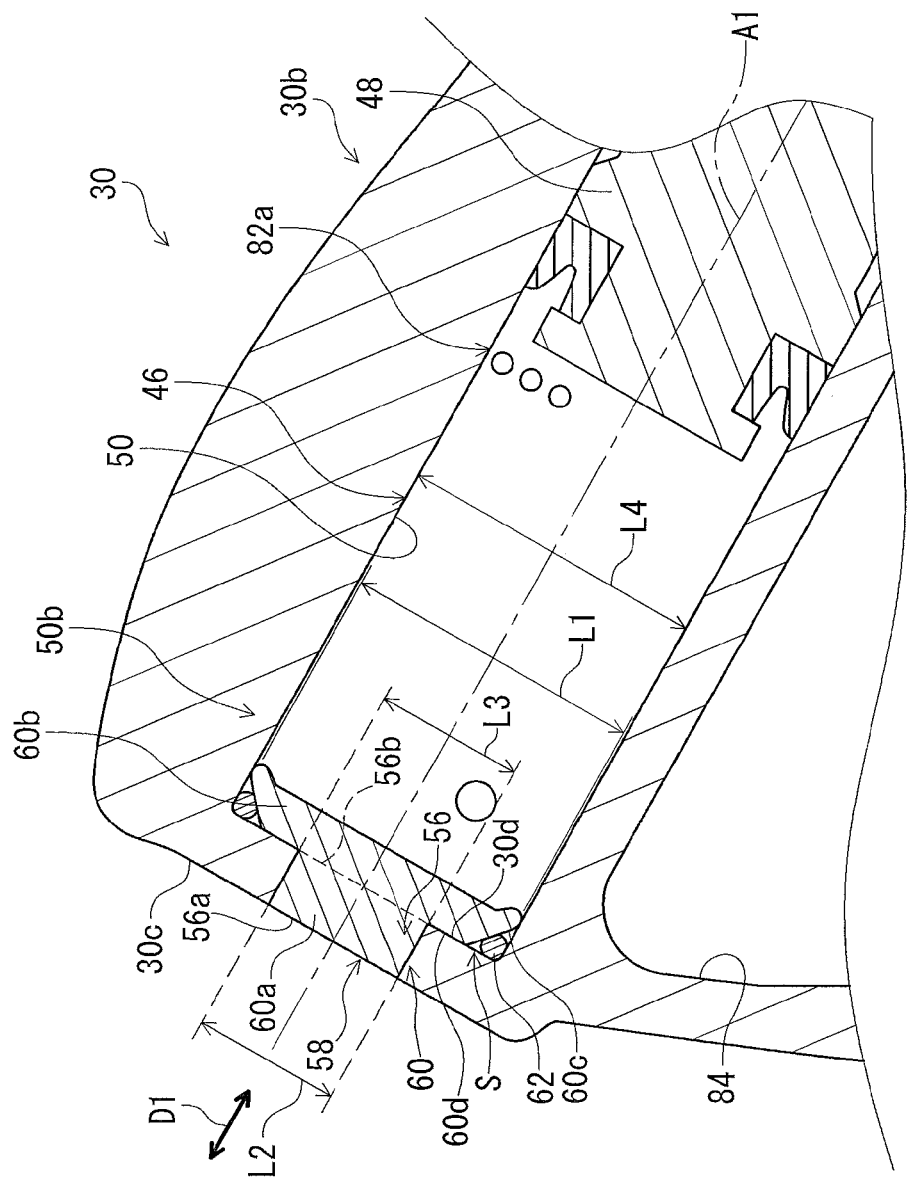
FIG. 4 is a partial enlarged cross-sectional view of the bicycle hydraulic operating device illustrated in FIG. 1.
Figure 5:
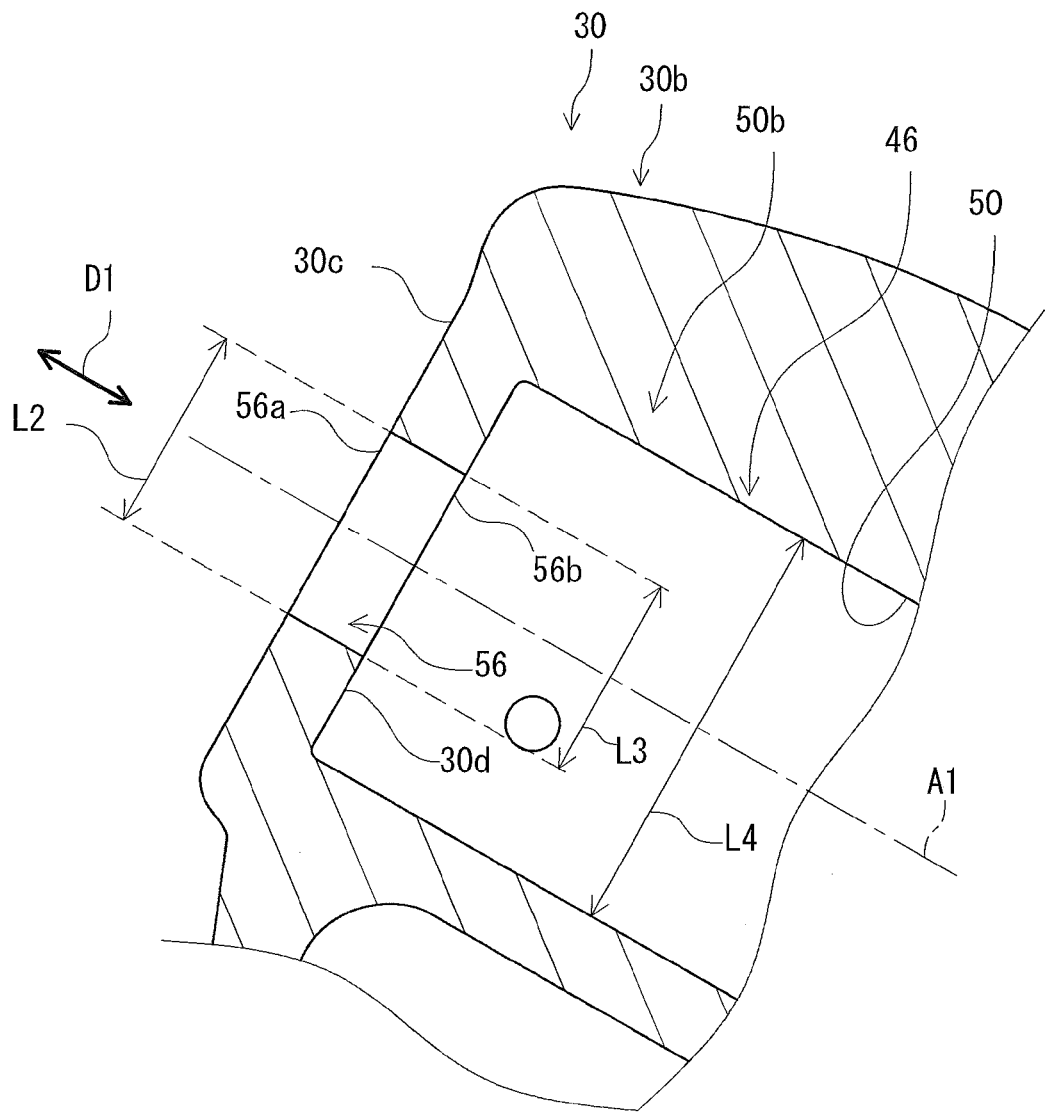
FIG. 5 is a partial enlarged cross-sectional view of the bicycle hydraulic operating device illustrated in FIG. 4 when a plug member is removed.

As illustrated in FIGS. 4 and 5, the through-hole 56 includes an outer opening 56a on an outer surface 30c of the bracket 30. The outer surface 30c is provided on a front side of the bracket 30 in a state where the bracket 30 is attached to the bicycle handlebar H. The through-hole 56 extends from the cylinder bore 50. The plug member 58 has an inside part 60 disposed inside the outer opening 56a. In the illustrated embodiment, the plug member 58 is completely provided inside the through-hole 56 and the cylinder bore 50. Namely, the inside part 60 corresponds to the entirety of the plug member 58. The plug member 58 is configured such that an outer end surface of the plug member 58 and the outer surface 30c of the bracket 30 provide no step therebetween.

As seen in FIG. 4, the inside part 60 has a maximum outer diameter L1 larger than an inner diameter L2 of the outer opening 56a. As seen FIGS. 4 and 5, the through-hole 56 includes an inner opening 56b arranged closer to the cylinder bore 50 than the outer opening 56a. The inner opening 56b has an inner diameter L3 smaller than an inner diameter L4 of the cylinder bore 50 so as to provide a step surface 30d between the through-hole 56 and the cylinder bore 50. As seen in FIG. 4, the maximum outer diameter L1 of the inside part 60 is larger than the inner diameter L3 of the inner opening 56b. The inner diameter L3 of the inner opening 56b is equal to the inner diameter L2 of the outer opening 56a. The maximum outer diameter L1 of the inside part 60 is substantially equal to the inner diameter L4 of the cylinder bore 50. The plug member 58 is configured to be attached to the through-hole 56 through the cylinder bore 50.

While the sizes of the through-hole 56 and the plug member 58 have the above relationships, it will be apparent to those skilled in the bicycle field from the present disclosure that the sizes of the through-hole 56 and the plug member 58 are not limited to the disclosed relationships. For example, the inner diameter L3 of the inner opening 56b can be equal to the inner diameter L4 of the cylinder bore 50. The inner diameter L3 of the inner opening 56b can be different from the inner diameter L2 of the outer opening 56a. The maximum outer diameter L1 of the inside part 60 can be equal to or smaller than the inner diameter L3 of the inner opening 56b. The maximum outer diameter L1 of the inside part 60 can be equal to or smaller than an inner diameter L2 of the outer opening 56a.

As seen in FIG. 4, the inside part 60 includes a first portion 60a and a second portion 60b. The first portion 60a is configured to be provided in the through-hole 56. The second portion 60b is configured to be provided in the cylinder bore 50 and has the maximum outer diameter L1.

The step surface 30d is opposite to the outer surface 30c with respect to the through-hole 56. The step surface 30d has an annular shape. The inner opening 56b of the through-hole 56 is provided on the step surface 30d. The bicycle hydraulic operating device 10 further comprises a seal ring 62 arranged between the second portion 60b and the step surface 30d. The seal ring 62 has an annular shape and is made of an elastic material such as rubber. The second portion 60b includes a first surface 60c. The first surface 60c is configured to contact the seal ring 62. The first surface 60c has an annular shape. The first surface 60c is configured to be tapered toward the inner opening 56b. While the seal ring 62 arranged between the second portion 60b and the step surface 30d, it will be apparent to those skilled in the bicycle field from the present disclosure that the seal ring 62 can be provided between the first portion 60a and an inner peripheral surface of the through-hole 56, for example.

As seen in FIG. 4, the first surface 60c and the step surface 30d define a sealing space S in which the seal ring 62 is provided. The seal ring 62 contacts the first surface 60c and the step surface 30d and is compressed between the first surface 60c and the step surface 30d. The seal ring 62 improves the sealing between the plug member 58 and the through-hole 56. However, it will be apparent to those skilled in the bicycle field from the present disclosure that the seal ring 62 can be omitted if needed and/or desired. Furthermore, it will be apparent to those skilled in the bicycle field from the present disclosure that the first surface 60c can be perpendicular to the first direction D1 and parallel to the inner surface 30d of the bracket 30.

As seen in FIG. 4, the second portion 60b further includes a second surface 60d configured to contact the step surface 30d. The second surface 60d has an annular shape and is provided around the first portion 60a. The step surface 30d and the second surface 60d are perpendicular to the first direction D1. However, it will be apparent to those skilled in the bicycle field from the present disclosure that the step surface 30d and the second surface 60d can be inclined with respect to the first direction D1. The first portion 60a is press-fitted into the through-hole 56 or is bonded to the through-hole 56 with adhesive, for example.

Returning to FIG. 3, the lever 34 is operatively connected to the piston 48 to move the piston 48 within the cylinder bore 50 in response to pivotal movement of the lever around the first axis X1. More specifically, the bicycle hydraulic operating device 10 further comprises an intermediate member 64 configured to be operatively coupled to the piston 48. The intermediate member 64 is configured to transmit the pivotal movement of the lever 34 to the piston 48. The piston 48 is disposed within the cylinder bore 50 and movable between an initial position P11 and an actuated position P12. In a state where the lever 34 is not operated by a rider, the piston 48 is positioned at the initial position P11 in the cylinder bore 50. As seen in FIG. 2, in a state where the lever 34 is operated by the rider to the operated position P2, the piston 48 is positioned at the actuated position P12.

As illustrated in FIG. 3, the intermediate member 64 includes a connecting rod 66, a connecting bracket 68, and a guide shaft 70. The connecting rod 66 is pivotally connected to the piston 48. The connecting bracket 68 is configured to pivotally connect the connecting rod 66 to the guide shaft 70. The guide shaft 70 is configured to contact the lever 34. More specifically, the lever 34 includes a cam member 71 configured to contact the guide shaft 70. Namely, the intermediate member 64 is configured to contact the lever 34.

Figure 6:
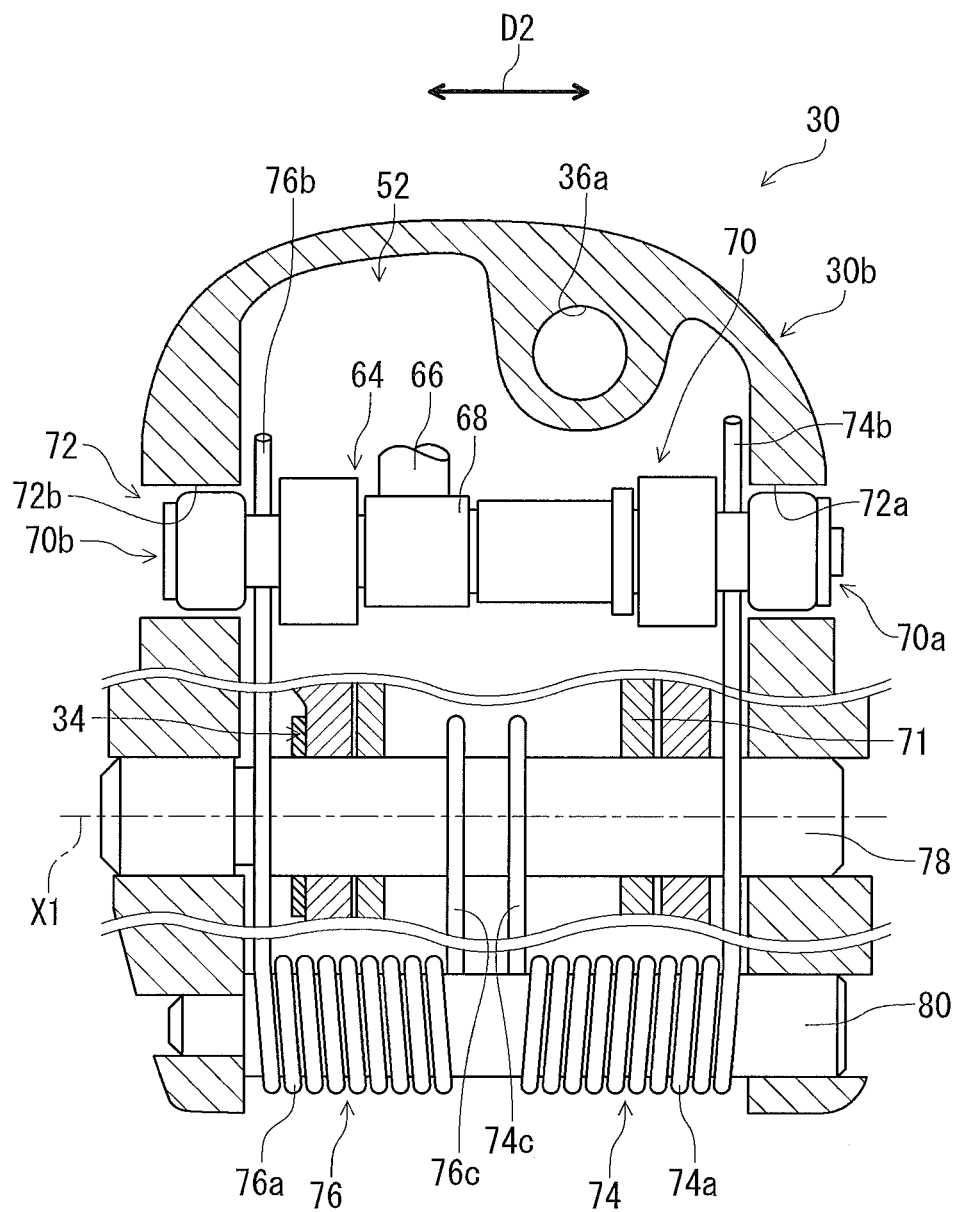
FIG. 6 is a partial schematic cross-sectional view of the bicycle hydraulic operating device illustrated in FIG. 1.

As seen in FIG. 3, the bracket 30 includes a guide structure 72 configured to guide the intermediate member 64 to move the piston 48 between the initial position P11 and the actuated position P12. More specifically, as seen in FIG. 6, the guide structure 72 includes a first guide groove 72a and a second guide groove 72b. The guide shaft 70 of the intermediate member 64 includes a first guide end portion 70a and a second guide end portion 70b. Namely, it can be said that the intermediate member 64 includes the first guide end portion 70a and the second guide end portion 70b. The first guide end portion 70a and the second guide end portion 70b oppositely extend in an axial direction D2 defined along the first axis X1. The guide shaft 70 extends in the axial direction D2. The first guide end portion 70a is opposite to the second guide end portion 70b in the axial direction D2. The first guide groove 72a is configured to guide the first guide end portion 70a. The second guide groove 72b is configured to guide the second guide end portion 70b. The first guide end portion 70a is provided in the first guide groove 72a. The second guide end portion 70b is provided in the second guide groove 72b. However, it will be apparent to those skilled in the bicycle field from the present disclosure that the guide structure 72 can include configurations other than the first guide groove 72a and the second guide groove 72b. Furthermore, the guide structure 72 can be provided in a member other than the bracket 30. Also, the guide structure 72 can be omitted if needed and/or desired.

As illustrated in FIGS. 3 and 6, the bicycle hydraulic operating device 10 further comprises a first biasing member 74 and a second biasing member 76. As seen in FIG. 3, the first biasing member 74 and the second biasing member 76 are provided outside the hydraulic cylinder 46. More specifically, the first biasing member 74 and the second biasing member 76 are provided outside the cylinder bore 50 of the hydraulic cylinder 46.

As seen in FIG. 3, the first biasing member 74 is operatively coupled to the piston 48 and the lever 34 outside the hydraulic cylinder 46 such that the first biasing member 74 biases the piston 48 towards the initial position P11 and biases the lever 34 towards the rest position P1 (FIG. 2). The intermediate member 64 is configured to contact the lever 34 so as to apply a biasing force of the first biasing member 74 to the lever 34.

As seen in FIG. 6, the first biasing member 74 is a torsion spring and includes a first main body 74a, a first end portion 74b, and a second end portion 74c. The first main body 74a is a coiled part of the torsion spring. The first main body 74a has a cylindrical shape and is configured to generate a biasing force to bias the piston 48. The first end portion 74b and the second end portion 74c extend from the first main body 74a. The first end portion 74b is configured to engage with the intermediate member 64 so as to bias the piston 48 towards the initial position P11 (FIG. 3). In the illustrated embodiment, as seen in FIG. 6, the first end portion 74b of the first biasing member 74 engages with the first guide end portion 70a of the intermediate member 64.

As seen in FIG. 6, the second end portion 74c is configured to engage with the bracket 30. More specifically, the bracket 30 further includes a pivot shaft 78 and a support shaft 80. The pivot shaft 78 defines the first axis X1 of the lever 34 and is configured to pivotally support the lever 34. The support shaft 80 differs from the pivot shaft 78 and passes through the first main body 74a so as to support the first biasing member 74. The second end portion 74c engages with the pivot shaft 78.

As seen in FIG. 3, the second biasing member 76 is operatively coupled to the piston 48 and the lever 34 outside the cylinder bore 50 such that the second biasing member 76 biases the piston 48 towards the initial position P11 and biases the lever 34 towards the rest position P1 (FIG. 2). The intermediate member 64 is configured to contact the lever 34 so as to apply a biasing force of the second biasing member 76 to the lever 34.

As seen in FIG. 6, the second biasing member 76 is a torsion spring and includes a second main body 76a, a third end portion 76b, and a fourth end portion 76c. The second main body 76a is a coiled part of the torsion spring. The second main body 76a has a cylindrical shape and is configured to generate a biasing force to bias the piston 48. The third end portion 76b and the fourth end portion 76c extend from the second main body 76a.

As seen in FIG. 6, the third end portion 76b is configured to engage with the intermediate member 64 so as to bias the piston 48 towards the initial position P11 (FIG. 3). In the illustrated embodiment, the third end portion 76b is configured to engage with the second guide end portion 70b of the intermediate member 64 so as to bias the piston 48 towards the initial position P11 (FIG. 3). The support shaft 80 passes through the second main body 76a so as to support the second biasing member 76. The fourth end portion 76c is configured to engage with the bracket 30. More specifically, the fourth end portion 76c engages with the pivot shaft 78.

As illustrated in FIGS. 3 and 6, the support shaft 80 is provided below the pivot shaft 78 in a state where the bracket 30 is mounted to the bicycle handlebar H (FIG. 1). However, it will be apparent to those skilled in the bicycle field from the present disclosure that the support shaft 80 can be provided above the pivot shaft 78 or at the same level as the pivot shaft 78, for example. The second biasing member 76 is spaced apart from the first biasing member 74 in the axial direction D2. The first biasing member 74 and the second biasing member 76 are arranged in the axial direction D2. However, it will be apparent to those skilled in the bicycle field from the present disclosure that the second biasing member 76 can be provided at a position other than the illustrated position. Furthermore, it will be apparent to those skilled in the bicycle field from the present disclosure that one of the first biasing member 74 and the second biasing member 76 can be omitted if needed and/or desired. The first biasing member 74 and the second biasing member 76 can be provided integrally with each other as a one piece unitary member. For example, the fourth end portion 76c of the second biasing member 76 can be integrally connected to the second end portion 74c of the first biasing member 74. It will be apparent to those skilled in the bicycle field from the present disclosure that the first biasing member 74 and/or the second biasing member 76 can be biasing members other than the torsion springs. Furthermore, the intermediate member 64 can be omitted if needed and/or desired. In such embodiment, at least one of the first biasing member 74 and the second biasing member 76 can directly bias the piston 48.

Figure 7:
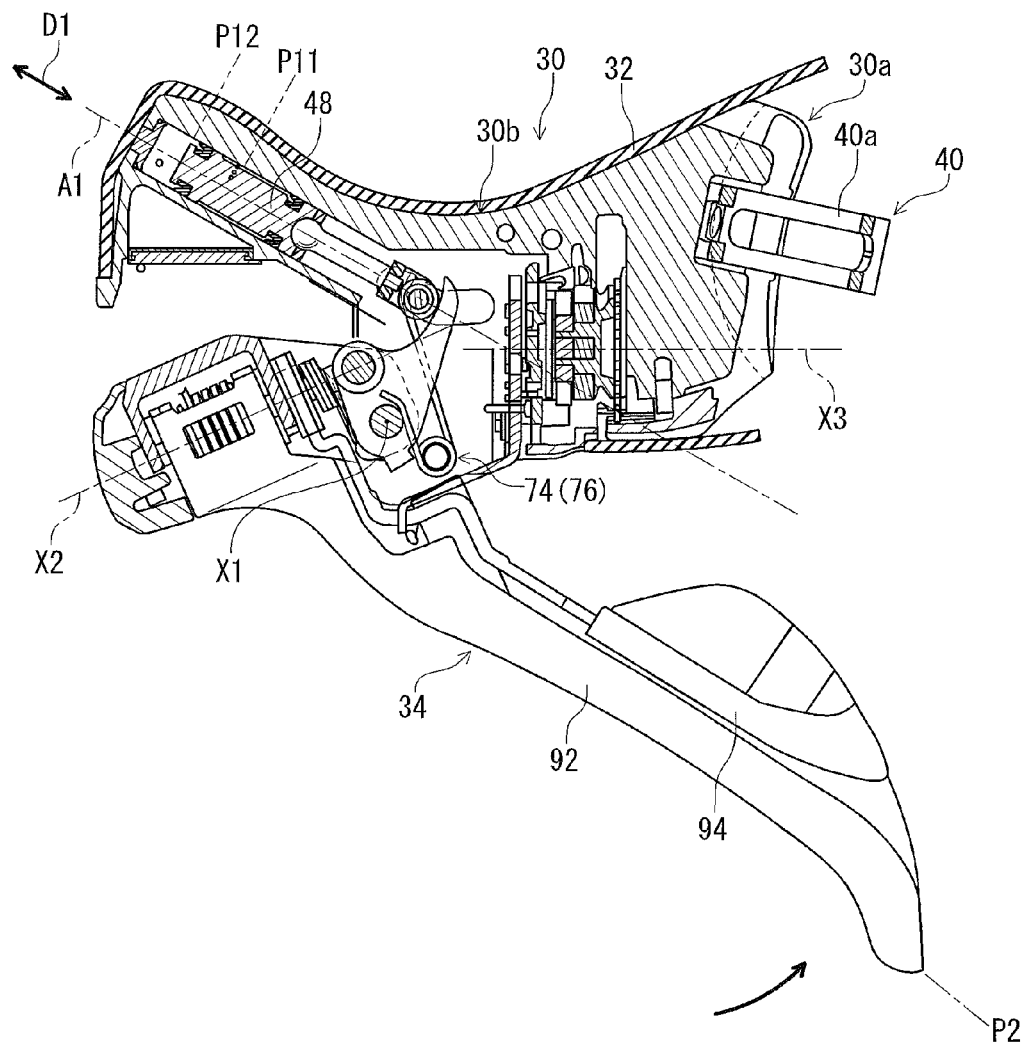
FIG. 7 is a cross-sectional view of the bicycle hydraulic operating device illustrated in FIG. 1.

As illustrated in FIG. 7, when the lever 34 is pivoted around the first axis X1 relative to the bracket 30, the piston 48 moves within the cylinder bore 50 against the biasing forces of the first biasing member 74 and the second biasing member 76. Operation of the lever 34 causes the hydraulic fluid to move from the cylinder bore 50 to a slave piston or pistons (not shown) in the hydraulic brake device 12 to apply frictional resistance. This causes the bicycle to be slowed down or stopped. Of course, the bicycle hydraulic operating device 10 can be applied to any kind of a bicycle hydraulic component.

As described above, the first biasing member 74 is operatively coupled to the piston 48 and the lever 34 outside the hydraulic cylinder 46 such that the first biasing member 74 biases the piston toward the initial position P11 and biases the lever 34 toward the rest position P1. This configuration can eliminate a biasing member from the inside of the hydraulic cylinder 46, allowing the hydraulic cylinder 46 to be more compact.

Returning to FIG. 3, the bicycle hydraulic operating device 10 further comprises a fluid reservoir tank 82. The fluid reservoir tank 82 is configured to store hydraulic fluid for generating hydraulic pressure. The hydraulic fluid can be supplied from the fluid reservoir tank 82 to the hydraulic cylinder 46 even if the necessary amount of the hydraulic fluid increases due to wearing of the friction material (for example, a brake pad) of the hydraulic brake device 12. The fluid reservoir tank 82 also can reduce changes in the hydraulic pressure applied to the hydraulic brake device 12 due to swelling and contraction caused by changes in the temperature of the hydraulic fluid. The fluid reservoir tank 82 communicates with the cylinder bore 50 of the hydraulic cylinder 46 via a first fluid passage 82a. The bracket 30 includes a second fluid passage 36a configured to connect the cylinder bore 50 to an outlet port 36b (FIG. 1). The cylinder bore 50 communicates with the second fluid passage 36a via a communicating opening 50c.

Figure 8:
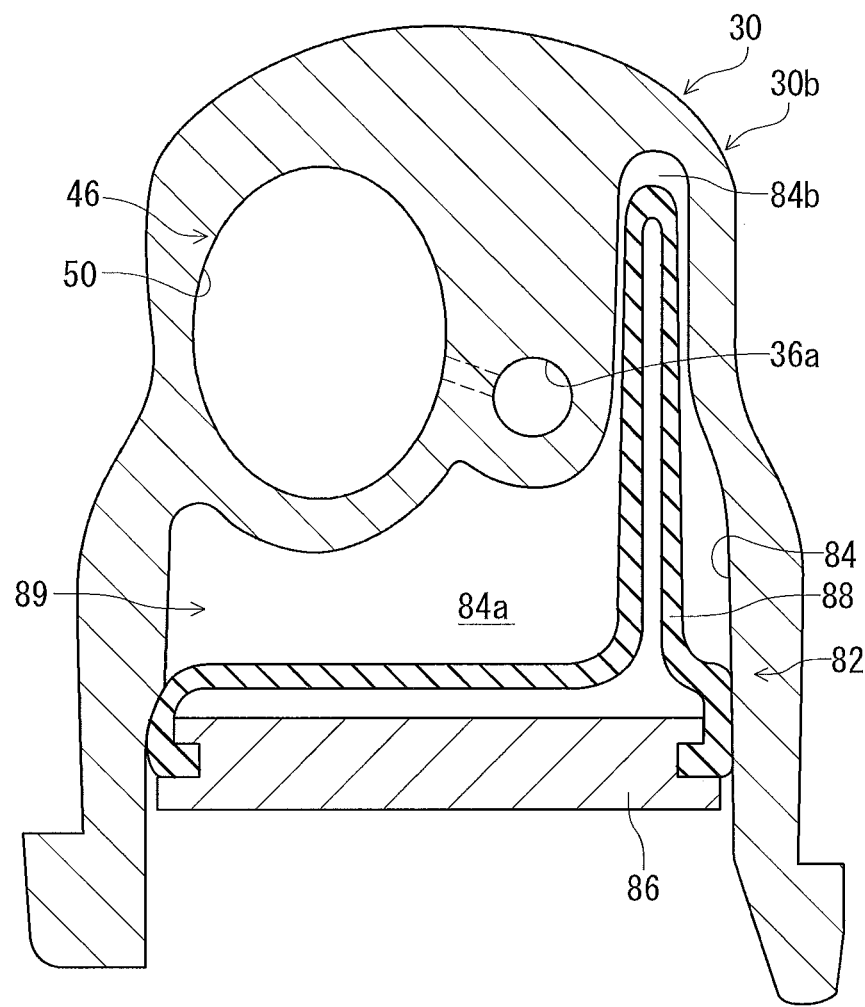
FIG. 8 is a partial schematic cross-sectional view of the bicycle hydraulic operating device illustrated in FIG. 1.

As seen in FIG. 8, the fluid reservoir tank 82 includes a fluid reservoir 84, a lid 86, and a flexible diaphragm 88. The lid 86 is secured to the bracket 30 to cover an opening of the fluid reservoir 84 using fasteners (not shown). The flexible diaphragm 88 is provided to be deformable in the fluid reservoir 84. The fluid reservoir 84, the lid 86, and the flexible diaphragm 88 define a reservoir chamber 89. The reservoir chamber 89 is configured to be filled with hydraulic fluid and is connected to the cylinder chamber via the first fluid passage 82a (FIG. 3). The fluid reservoir 84 includes a first reservoir section 84a and a second reservoir section 84b. The first reservoir section 84a is provided below the cylinder bore 50. The second reservoir section 84b is recessed from the first reservoir section 84a towards an opposite side of the lid 86 with respect to the first reservoir section 84a. The second fluid passage 36a is provided between the second reservoir section 84b and the cylinder bore 50.

Figure 9:
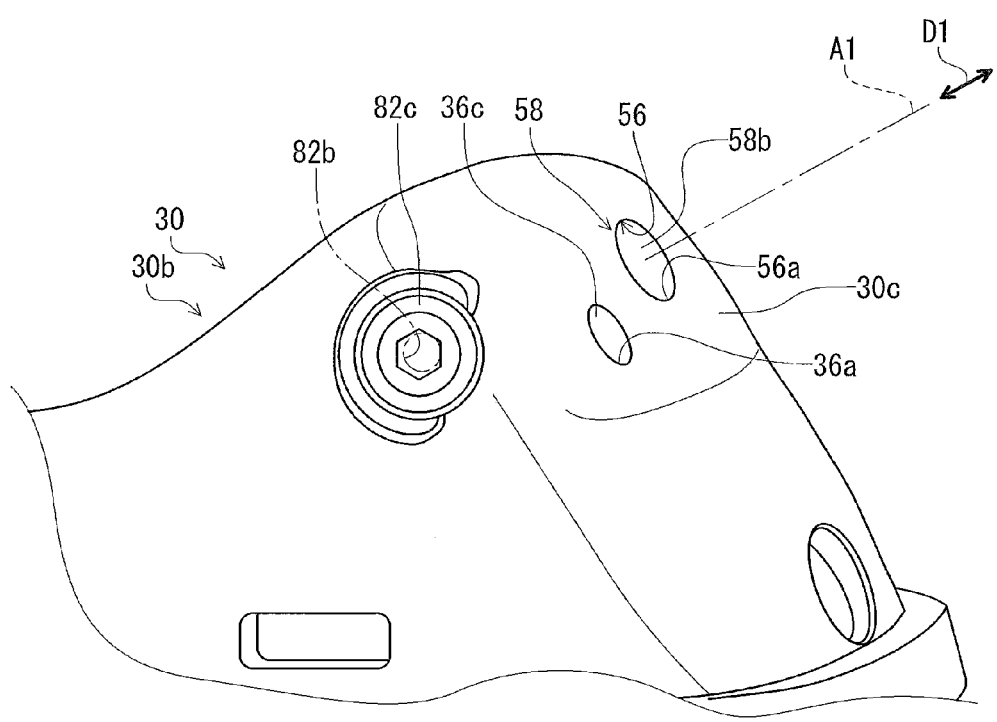
FIG. 9 is a partial perspective view of the bicycle hydraulic operating device illustrated in FIG. 1.

As seen in FIG. 9, one end of the second fluid passage 36a is plugged up by an end plug 36c. The second fluid passage 36a is adjacent to through-hole 56 and the plug member 58. The bracket 30 includes a fluid supplying port 82b through which hydraulic fluid is to be supplied to the fluid reservoir tank 82. A lid 82c is removably attached to the fluid supplying port 82b.

Returning to FIG. 3, the lever 34 is configured to rotatable about a second axis X2 which differs from the first axis X1 and operatively connected to the cable operating mechanism 38 in response to rotational movement of the lever 34 around the second axis X2. More specifically, the lever 34 includes a lever support bracket 90, a support rod 91, a first operating lever 92, a second operating lever 94, a first return spring 96, and a second return spring 98.

As seen in FIG. 3, the lever support bracket 90 is supported by the pivot shaft 78 pivotally relative to the bracket 30 around the first axis X1. The lever support bracket 90 is coupled to the cam member 71 by the support rod 91 to be integrally rotatable around the first axis X1 relative to the bracket 30. The first operating lever 92 is pivotally supported around the second axis X2 relative to the bracket 30 by the lever support bracket 90. In the illustrated embodiment, the support rod 91 is attached to the lever support bracket 90, and the support rod 91 pivotally supports the first operating lever 92 around the second axis X2 relative to the lever support bracket 90. The second operating lever 94 is supported by the lever support bracket 90 pivotally around the second axis X2 relative to the bracket 30. The second axis X2 extends along a longitudinal direction D3 (forward-rearward direction) of the bicycle and is disposed above the first axis X1 in a state where the bicycle hydraulic operating device 10 is mounted to the bicycle handlebar H (FIG. 1).

Figure 10:
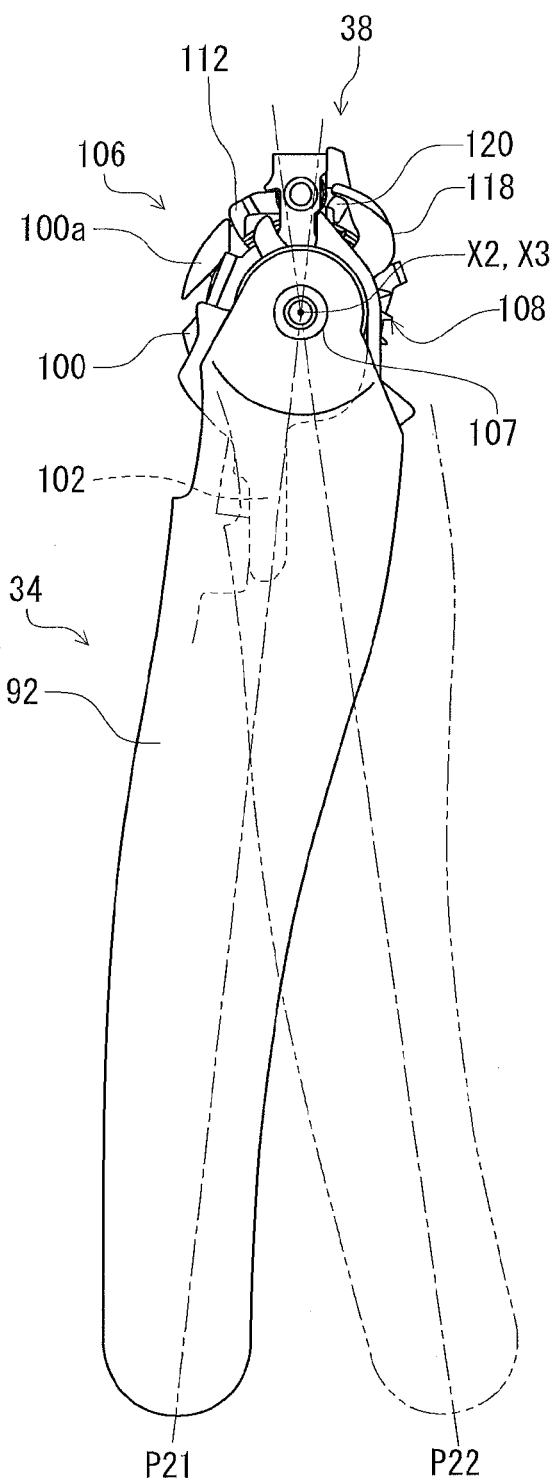
FIG. 10 is a front view of a first operating lever of and a cable operating mechanism of the bicycle hydraulic operating device illustrated in FIG. 1.

As illustrated in FIG. 10, the first operating lever 92 is configured to be pivotally provided around the second axis X2 relative to the bracket 30 between a first rest position P21 and a first shift position P22. The first return spring 96 (FIG. 3) is configured to bias the first operating lever 92 from the first shift position P22 towards the first rest position P21. The first operating lever 92 is configured to be pivotally provided around the second axis X2 by the rider relative to the bracket 30 to operate the rear derailleur 26 (FIG. 1) through the cable operating mechanism 38. In the illustrated embodiment, the first operating lever 92 is configured to be pivotally provided around the second axis X2 relative to the bracket 30 by the rider to downshift the rear derailleur 26 into a lower gear, for example.

Figure 11:
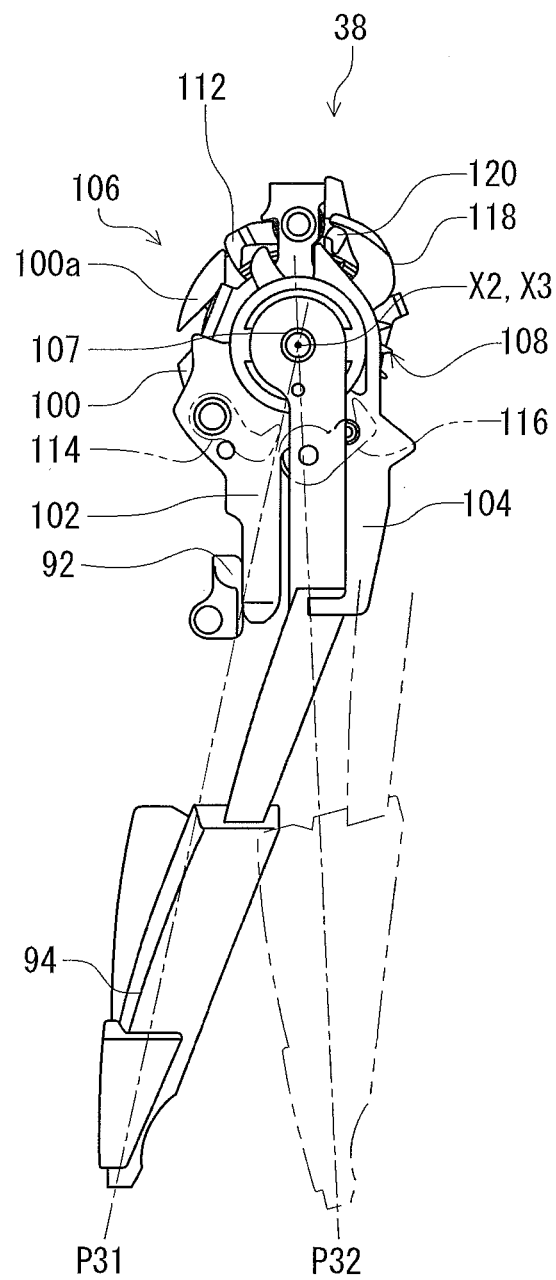
FIG. 11 is a front view of a second operating lever of and the cable operating mechanism of the bicycle hydraulic operating device illustrated in FIG. 1.

As illustrated in FIG. 11, the second operating lever 94 is configured to be pivotally provided around the second axis X2 relative to the bracket 30 between a second rest position P31 and a second shift position P32. The second return spring 98 (FIG. 3) is configured to bias the second operating lever 94 from the second shift position P32 towards the second rest position P31. The second operating lever 94 is pivotally provided around the second axis X2 relative to the bracket 30 towards the second shift position P32 together with the first operating lever 92 when the first operating lever 92 is pivoted around the second axis X2 relative to the bracket 30 towards the first shift position P22. The second operating lever 94 is further configured to be pivotally provided around the second axis X2 relative to the bracket 30 by the rider in a state where the first operating lever 92 is positioned at the first rest position P21. The second operating lever 94 is configured to be pivotally provided around the second axis X2 relative to the bracket 30 by the rider to operate the rear derailleur 26 (FIG. 1) through the cable operating mechanism 38. In the illustrated embodiment, the second operating lever 94 is configured to be pivotally provided around the second axis X2 relative to the bracket 30 by the rider to upshift the rear derailleur 26 into a higher gear, for example.

Figure 12:
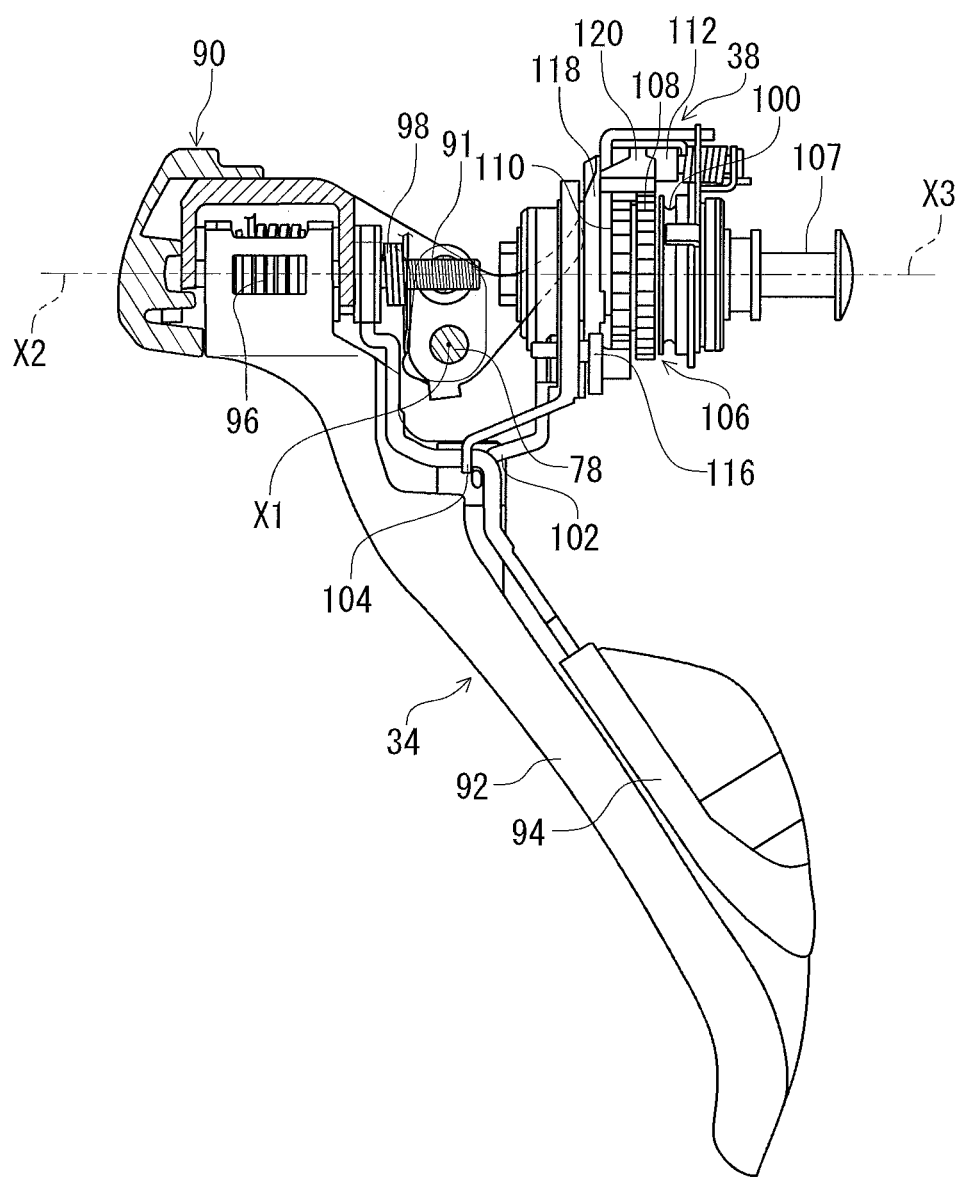
FIG. 12 is a side view of the first operating lever, the second operating lever, and the cable operating mechanism of the bicycle hydraulic operating device illustrated in FIG. 1.

As illustrated in FIG. 12, the cable operating mechanism 38 includes a cable take-up member 100, a first input member 102, a second input member 104, and a positioning mechanism 106. The cable take-up member 100 is rotatably provided about a third axis X3 relative to the bracket 30. The cable take-up member 100 is rotatably supported about the third axis X3 relative to the bracket 30 by a cable take-up shaft 107. In the illustrated embodiment, the third axis X3 is coaxial with the second axis X2 when the lever 34 is disposed at the rest position P1. An inner cable of the operation cable 28 (FIG. 1) is coiled around the cable take-up member 100. An end of the inner cable of the operation cable 28 is attached to the cable take-up member 100.

Figure 13:
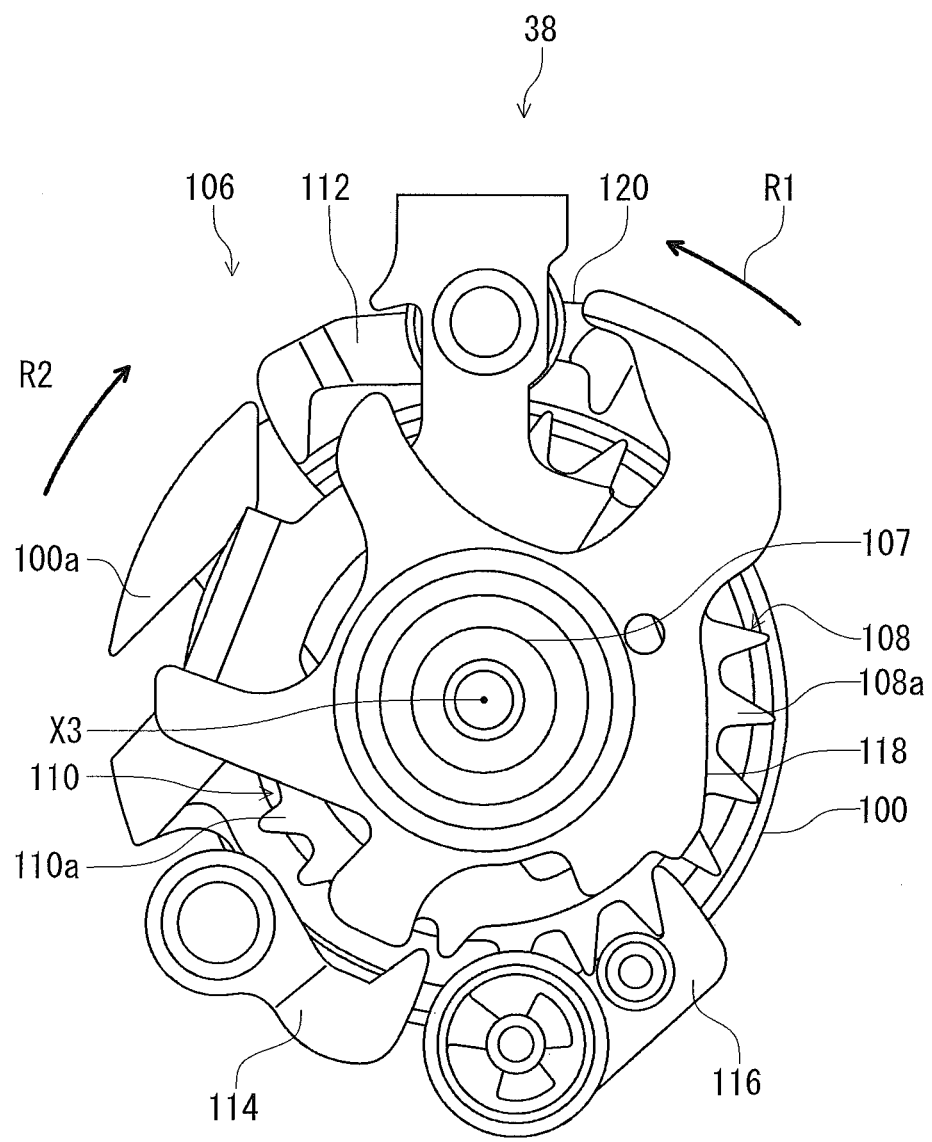
FIG. 13 is a front view of the cable operating mechanism of the bicycle hydraulic operating device illustrated in FIG. 1.

As seen in FIG. 13, the cable take-up member 100 has a substantially cylindrical shape and includes a cable attachment part 100a to which the end of the inner cable of the operation cable 28 is to be attached. When the cable take-up member 100 is rotated relative to the bracket 30 in a first rotational direction R1, the inner cable of the operation cable 28 is taken up by the cable take-up member 100. When the cable take-up member 100 is rotated about the third axis X3 relative to the bracket 30 in a second rotational direction R2, the inner cable of the operation cable 28 is reeled out from the cable take-up member 100. The cable take-up member 100 is biased in the second rotational direction R2 by a take-up return spring (not shown). Specifically, the take-up return spring applies a biasing force to the cable take-up member 100 so as to rotate relative to the bracket 30 in the second rotational direction R2. Namely, the cable take-up member 100 is biased in the second rotational direction R2 by the take-up return spring to reel out the inner cable of the operation cable 28.

In the illustrated embodiment, as seen in FIGS. 10, 11 and 13, when the first operating lever 92 is operated from the first rest position P21 towards the first shift position P22, the cable take-up member 100 rotates about the third axis X3 relative to the bracket 30 in the first rotational direction R1 to take up the inner cable of the operation cable 28. When the second operating lever 94 is operated from the second rest position P31 towards the second shift position P32, the cable take-up member 100 rotates about the third axis X3 in the second rotational direction R2 to reel out the inner cable of the operation cable 28.

As seen in FIG. 10, the first input member 102 is configured to be pivotally provided around the third axis X3 in response to the pivoting of the first operating lever 92 around the second axis X2. More specifically, an end of the first input member 102 is configured to contact the first operating lever 92 to be pressed by the first operating lever 92 from the first rest position P21 to the first shift position P22. Thus, when the first operating lever 92 is pivoted around the second axis X2 relative to the bracket 30 from the first rest position P21 to the first shift position P22, the first input member 102 is pivoted around the third axis X3 relative to the bracket 30 together with the first operating lever 92. The pivotal movement of the first operating lever 92 is transmitted to the positioning mechanism 106 via the first input member 102.

As seen in FIG. 11, the second input member 104 is configured to be pivotally provided around the third axis X3 in response to the pivoting of the second operating lever 94 around the second axis X2. More specifically, an end of the second input member 104 is configured to contact the second operating lever 94 to be pressed by the second operating lever 94 from the second rest position P31 to the second shift position P32. Thus, when the second operating lever 94 is pivoted around the second axis X2 relative to the bracket 30 from the second rest position P31 to the second shift position P32, the second input member 104 is pivoted around the third axis X3 relative to the bracket 30 together with the second operating lever 94. The pivotal movement of the second operating lever 94 is transmitted to the positioning mechanism 106 via the second input member 104.

Furthermore, the second operating lever 94 is configured to be pivotally provided around the third axis X3 in response to the pivoting of the first operating lever 92. More specifically, the second operating lever 94, the first input member 102, and the second input member 104 are pivoted around the third axis X3 relative to the bracket 30 together with the first operating lever 92 when the first operating lever 92 is pivoted about the second axis X2 relative to the bracket 30 towards the first shift position P22.

As seen in FIG. 13, the positioning mechanism 106 is configured to position the cable take-up member 100 relative to the bracket 30 in a rotational direction of the cable take-up member 100 in accordance with the gear shift level. The positioning mechanism 106 includes a positioning plate 108, a take-up plate 110, a positioning hook 112, a take-up hook 114, a release hook 116, a release plate 118, and an arrest hook 120.

As seen in FIG. 12, the positioning plate 108 and the take-up plate 110 are attached to the cable take-up member 100 to rotate about the third axis X3 together with the cable take-up member 100. Namely, the cable take-up member 100, the positioning plate 108, and the take-up plate 110 are configured to be integrally rotatable about the third axis X3 relative to the bracket 30.

As seen in FIG. 13, the cable take-up member 100, the positioning plate 108, and the take-up plate 110 are biased by the take-up return spring (not shown) in the second rotational direction R2. The positioning plate 108 includes positioning cogs 108a. The take-up plate 110 includes take-up cogs 110a. The positioning hook 112 is configured to engage with the positioning cogs 108a of the positioning plate 108 to keep the rotational position of the positioning plate 108 against the biasing force of the take-up return spring. The positioning hook 112 is biased by a first hook biasing member (not shown) to keep engaging with the positioning cogs 108a of the positioning plate 108. Thus, the cable take-up member 100 can be kept at a predetermined shift position after either a take-up operation using the first operating lever 92 or a release operation using the second operating lever 94.

As seen in FIG. 11, the take-up hook 114 is pivotally provided on the first input member 102. The take-up hook 114 and the first input member 102 are rotated about the third axis X3 relative to the bracket 30 in the first rotational direction R1 when the first operating lever 92 is operated from the first rest position P21 towards the first shift position P22.

As seen in FIG. 13, the take-up hook 114 is configured to engage with the take-up cogs 110a of the take-up plate 110. The take-up hook 114 is biased by a second hook biasing member (not shown) to engage with the take-up cogs 110a of the take-up plate 110. The first input member 102 and the take-up hook 114 are rotated about the third axis X3 relative to the bracket 30 in the first rotational direction R1 when the first operating lever 92 is operated from the first rest position P21 towards the first shift position P22. The rotation of the first input member 102 is transmitted to the take-up plate 110 via the take-up hook 114. This causes the take-up plate 110, the cable take-up member 100, and the positioning plate 108 to be rotated about the third axis X3 relative to the bracket 30 in the first rotational direction R1 against the biasing force of the take-up return spring. At this time, one of the positioning cogs 108a of the positioning plate 108 lifts the positioning hook 112 against the biasing force of the first hook biasing member in response to the rotating of the positioning plate 108. After the positioning hook 112 gets over the one of the positioning cogs 108a, the positioning hook 112 engages with another of the positioning cogs 108a. This allows the take-up plate 110, the cable take-up member 100, and the positioning plate 108 to be stepwise rotated about the third axis X3 relative to the bracket 30 at a pitch of the positioning cogs 108a in the first rotational direction R1.

As seen in FIG. 13, the release plate 118 is configured to be rotated about the third axis X3 by the release hook 116 in the first rotational direction RI. The release plate 118 is configured to release the positioning plate 108 from the positioning hook 112 to rotate the positioning plate 108 relative to the bracket 30 in the second rotational direction R2.

As seen in FIG. 11, the release hook 116 is pivotally provided on the second input member 104. The release hook 116 and the second input member 104 are rotated about the third axis X3 relative to the bracket 30 in the first rotational direction R1 when the second operating lever 94 is operated from the second rest position P31 towards the second shift position P32. The release hook 116 is configured to be disposed at a disengaging position and an engaging position with respect to the second input member 104. The release hook 116 is disposed at the disengaging position with respect to the second input member 104 when the second operating lever 94 is pivoted from the second rest position P31 towards the second shift position P32 in response to the pivoting of the first operating lever 92. The release hook 116 is disposed at the engaging position with respect to the second input member 104 when the second operating lever 94 is operated from the second rest position P31 towards the second shift position P32 without the pivoting of the first operating lever 92.

The engaging position allows the release hook 116 to contact the release plate 118 to transmit the pivotal movement of the second operating lever 94 to the release plate 118. The disengaging position prevents the pivotal movement of the second operating lever 94 from being transmitted to the release plate 118 via the release hook 116. Namely, the release plate 118 is rotated about the third axis X3 by the release hook 116 in the first rotational direction R1 when the second operating lever 94 is operated from the second rest position P31 towards the second shift position P32 without the pivoting of the first operating lever 92.

When the second operating lever 94 is pivoted around the second axis X2 relative to the bracket 30 and the first operating lever 92, the release hook 116 engages with the release plate 118 to rotate the release plate 118 in the first rotational direction R1. The rotation of the release plate 118 causes the arrest hook 120 to be inserted between the positioning cogs 108a of the positioning plate 108 at a different position from the positioning hook 112. On the other hand, the rotation of the release plate 118 causes the positioning hook 112 to disengage from the positioning cogs 108a of the positioning plate immediately after the engaging of the arrest hook 120. Furthermore, the rotation of the release plate 118 causes the take-up hook 114 to disengage from the take-up cogs 110a of the take-up plate 110. Accordingly, the cable take-up member 100, the positioning plate 108, and the take-up plate 110 are rotated by the biasing force of the take-up return spring until the arrest hook 120 contacts one of the positioning cogs 108a of the positioning plate 108. When the second operating lever 94 is retuned to the second rest position P31, the release plate 118 is retuned to its initial position, causing the positioning hook 112 and the take-up hook 114 to engage with the positioning cogs 108a and the take-up cogs 110a, respectively. Also, when the second operating lever 94 is retuned to the second rest position P31, the arrest hook 120 is returned to its initial position. Thus, the take-up plate 110, the cable take-up member 100, and the positioning plate 108 can be stepwise rotated about the third axis X3 relative to the bracket 30 at a pitch of the positioning cogs 108a in the second rotational direction R2.

In the illustrated embodiment, a rider can pivot the first operating lever 92 around the first axis X1 relative to the bracket 30 from the rest position P1 to the operated position P2 while gripping the grip portion 30b through the grip cover 32. This pivotal movement of the first operating lever 92 causes the piston 48 to be depressed, generating hydraulic pressure within the hydraulic cylinder 46. Thus, the hydraulic pressure actuates the hydraulic brake device 12 to slow down or stop the bicycle.

Furthermore, the rider can pivot the first operating lever 92 around the second axis X2 relative to the bracket 30 from the first rest position P21 to the first shift position P22 while gripping the grip portion 30b through the grip cover 32. This pivot movement of the first operating lever 92 causes the cable operating mechanism 38 to take up the inner cable of the operation cable 28 to downshift the rear derailleur 26 into a lower gear. The rider can pivot the second operating lever 94 around the second axis X2 relative to the bracket 30 and the first operating lever 92 from the second rest position P31 to the second shift position P32 while gripping the grip portion 30b through the grip cover 32. This pivotal movement of the second operating lever 94 causes the cable operating mechanism 38 to reel out the inner cable of the operation cable 28 to upshift the rear derailleur 26 into a higher gear.

Second Embodiment

A bicycle hydraulic operating device 210 in accordance with the second embodiment will be described below referring to FIG. 14. Elements having substantially the same function as those in the first embodiment will be numbered the same here, and will not be described again in detail.

Figure 14:
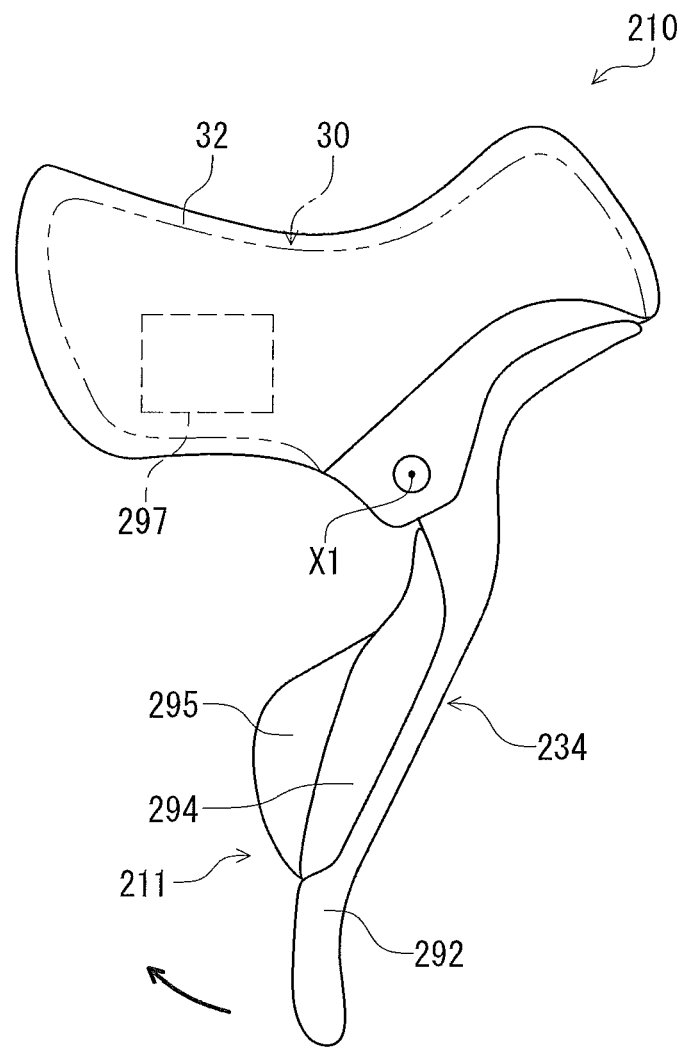
FIG. 14 is a side view of a bicycle hydraulic operating device in accordance with a second embodiment.

As seen in FIG. 14, the bicycle hydraulic operating device 210 comprises a lever 234 and an electric switch unit 211. The electric switch unit 211 is provided on at least one of the bracket 30 and the lever 234 and is configured to be electrically connected to a bicycle electric component. In the illustrated embodiment, the electric switch unit 211 is provided on the lever 234. However, it will be apparent to those skilled in the bicycle field from the present disclosure that the electric switch unit 211 can be provided on the bracket 30, or on both the lever 234 and the bracket 30. The electric switch unit 211 is configured to perform gear shifting operations of a shifting device. The electric switch unit 211 is configured to be electrically connected to an electric derailleur (not shown) via an electric cable (not shown). However, it will be apparent to those skilled in the bicycle field from the present disclosure that the electric switch unit 211 can be communicated with the bicycle electric component using a wireless technology.

As seen in FIG. 14, the lever 234 is configured to be pivotally provided around the first axis X1 relative to the bracket 30. More specifically, the lever 234 includes a brake lever 292 configured to be pivotally provided around the first axis X1 relative to the bracket 30. Unlike the first operating lever 92 of the first embodiment, the brake lever 292 is not configured to be pivotally provided around the second axis X2 relative to the bracket 30.

As seen in FIG. 14, the electric switch unit 211 is provided on the brake lever 292. The electric switch unit 211 includes a first operating member 294 and a second operating member 295. The first operating member 294 and the second operating member 295 are provided on the brake lever 292. Each of the first operating member 294 and the second operating member 295 is pivotally provided relative to the brake lever 292. The first operating member 294 is configured to be operated by a rider to downshift the rear derailleur 26, for example The second operating member 295 is configured to be operated by a rider to upshift the rear derailleur 26, for example. It will be apparent to those skilled in the bicycle field from the present disclosure that the first operating member 294 and the second operating member 295 are not limited to the illustrated structure and arrangement, but rather other suitable structures and arrangements can be used as needed and/or desired.

As seen in FIG. 14, the bicycle hydraulic operating device 210 includes a control unit 297 instead of the cable operating mechanism 38 of the first embodiment. The first operating member 294 and the second operating member 295 are electrically connected to the control unit 297. The control unit 297 includes a microcomputer and is located in the bracket 30, for example However, the control unit 297 can be remotely located if needed and/or desired. Since various electrical shifting systems are known in the bicycle field, the first operating member 294, the second operating member 295, and the control unit 297 will not be discussed herein for the sake of brevity. Furthermore, the bicycle hydraulic operating device 210 has substantially the same configurations as the bicycle hydraulic operating device 10 of the first embodiment except for the newly explained configurations in the second embodiment.

As described above, the electric switch unit 211 can be applied to the bicycle hydraulic operating device instead of a mechanical shifter such as the lever 34 and the cable operating mechanism 38 of the first embodiment.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle hydraulic operation device comprising:
a bracket including a gripping portion configured to be gripped by a rider;
a hydraulic cylinder;
a piston disposed within the hydraulic cylinder and movable between an initial position and an actuated position;

a lever pivotally mounted to the bracket around a first axis and operatively coupled to the piston to move the piston in response to pivotal movement of the lever from a rest position to an operated position; and a first biasing member operatively coupled to the piston and the lever outside the hydraulic cylinder such that the first biasing member biases the piston toward the initial position and biases the lever toward the rest position.

2. The bicycle hydraulic operation device according to claim 1, further comprising:

an intermediate member configured to be operatively coupled to the piston, wherein the first biasing member includes a first end portion configured to engage with the intermediate member so as to bias the piston toward the initial position.

3. The bicycle hydraulic operation device according to claim 2, wherein the intermediate member is configured to contact the lever so as to apply biasing force of the first biasing member to the lever.

4. The bicycle hydraulic operation device according to claim 2, wherein the first biasing member further includes a second end portion configured to engage with the bracket.

5. The bicycle hydraulic operation device according to claim 4, wherein the first biasing member further includes a first main body having a cylindrical shape, the first end portion and the second end portion extend from the first main body.

6. The bicycle hydraulic operation device according to claim 5, wherein the bracket further includes
a pivot shaft defining the first axis of the lever and configured to pivotally support the lever, and
a support shaft differing from the pivot shaft and passing through the first main body so as to support the first biasing member.

7. The bicycle hydraulic operation device according to claim 6, wherein the second end portion engages with the pivot shaft.

8. The bicycle hydraulic operation device according to claim 6, wherein the support shaft is provided below the pivot shaft in a state where the bracket is mounted to the bicycle handlebar.

9. The bicycle hydraulic operation device according to claim 2, wherein the bracket includes a guide structure configured to guide the intermediate member to move the piston between the initial position and the actuated position.

10. The bicycle hydraulic operation device according to claim 9, wherein the intermediate member includes a first guide end portion and a second guide end portion,
the first guide end portion and the second guide end portion oppositely extend in an axial direction defined along the first axis, and
the guide structure includes
a first guide groove configured to guide the first guide end portion, and
a second guide groove configured to guide the second guide end portion.

11. The bicycle hydraulic operation device according to claim 10, wherein the first end portion of the first biasing member engages with the first guide end portion of the intermediate member.

12. The bicycle hydraulic operation device according to claim 11, further comprising:

a second biasing member operatively coupled to the piston and the lever outside the hydraulic cylinder such that the second biasing member biases the piston toward the initial position and biases the lever toward the rest position.

13. The bicycle hydraulic operation device according to claim 12, wherein the second biasing member is spaced apart from the first biasing member in the axial direction.

14. The bicycle hydraulic operation device according to claim 13, wherein the second biasing member includes a third end portion configured to engage with the second guide end portion of the intermediate member so as to bias the piston toward the initial position.

15. The bicycle hydraulic operation device according to claim 14, wherein the second biasing member further includes
a fourth end portion configured to engage with the bracket, and
a second main body having a cylindrical shape,
the third end portion and the fourth end portion extend from the second main body.

16. The bicycle hydraulic operation device according to claim 15, wherein the first biasing member further includes
a second end portion configured to engage with the bracket, and
a first main body having a cylindrical shape,
the first end portion and the second end portion extend from the first main body, and the bracket further includes
a pivot shaft defining the first axis of the lever and configured to pivotally support the lever with respect to the bracket, and
a support shaft differing from the pivot shaft and passing through the first main body and the second main body so as to support the first biasing member and the second biasing member.

17. The bicycle hydraulic operation device according to claim 1, wherein the hydraulic cylinder is provided on the bracket.

18. The bicycle hydraulic operation device according to claim 1, wherein one of the bracket and the lever has a cable operating mechanism, and
the lever is configured to be rotatable about a second axis which differs from the first axis and operatively connected to the cable operating mechanism in response to rotational movement of the lever around the second axis.

19. The bicycle hydraulic operation device according to claim 1, further comprising:

an electric switch unit provided on at least one of the bracket and the lever and configured to be electrically connected to a bicycle electric component.

* * * * *